US008198391B2

(12) United States Patent
Itoya et al.

(10) Patent No.: US 8,198,391 B2
(45) Date of Patent: Jun. 12, 2012

(54) PIGMENT DISPERSION AND AQUEOUS INK FOR INKJET RECORDING

(75) Inventors: Kazuo Itoya, Yachiyo (JP); Hiroshi Kinoshita, Chiba (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/121,547

(22) PCT Filed: Sep. 16, 2009

(86) PCT No.: PCT/JP2009/066121
§ 371 (c)(1),
(2), (4) Date: Mar. 29, 2011

(87) PCT Pub. No.: WO2010/035665
PCT Pub. Date: Apr. 1, 2010

(65) Prior Publication Data

US 2011/0184123 A1 Jul. 28, 2011

(30) Foreign Application Priority Data

Sep. 29, 2008 (JP) ................................ 2008-250206

(51) Int. Cl.

| | |
|---|---|
| ***C08G 18/00*** | (2006.01) |
| ***C08G 18/08*** | (2006.01) |
| ***C08G 18/28*** | (2006.01) |
| ***C08G 18/70*** | (2006.01) |
| ***C08J 3/00*** | (2006.01) |
| ***C08K 3/20*** | (2006.01) |
| ***C08L 75/00*** | (2006.01) |

(52) U.S. Cl. .......... 528/85; 524/589; 524/590; 524/591; 524/839; 524/840; 528/44; 528/71

(58) Field of Classification Search .................. 524/591, 524/839, 840, 589, 590; 528/44, 71, 85
See application file for complete search history.

(56) References Cited

U.S. PATENT DOCUMENTS 5,696,182 A 12/1997 Kashiwazaki et al.
6,034,154 A 3/2000 Kase et al.
2002/0019458 A1 2/2002 Hirasa et al.
2003/0184629 A1 10/2003 Valentini et al.
2008/0139735 A1 6/2008 Reisacher et al.

FOREIGN PATENT DOCUMENTS

| | | | |
|---|---|---|---|
| JP | 06-279718 | A | 10/1994 |
| JP | 08-218015 | A | 8/1996 |
| JP | 2002-167536 | A | 6/2002 |
| JP | 2004-197104 | A | 7/2004 |
| JP | 2004-300393 | A | 10/2004 |
| JP | 2005-515289 | A | 5/2005 |
| JP | 2008-024733 | A | 2/2008 |
| WO | WO-03/062331 | A1 | 7/2003 |

OTHER PUBLICATIONS

International Search Report dated Dec. 28, 2009, issued for PCT/JP2009/066121 with English translation thereof.
Notice of Allowance mailed Sep. 30, 2010, issued on Japanese Patent Application No. 2010-511005 English translation thereof.
European Search Report issued in Corresponding European Patent Application No. 09816080.1, dated Feb. 6, 2012.

*Primary Examiner* — Patrick Niland
(74) *Attorney, Agent, or Firm* — Edwards Wildman Palmer LLP; James E. Armstrong, IV.; Nicholas J. DiCeglie, Jr.

(57) ABSTRACT

There is provided a pigment dispersion including water, an aqueous polymer and a pigment as essential components, wherein the aqueous polymer is a carboxyl group-containing polyurethane which is formed by reacting a diol compound, a diisocyanate compound and a reaction product, which is mainly composed of a compound represented by general formula (1) and prepared by reacting a diol compound having one or two carboxyl groups within each molecule with a diisocyanate compound and which also has a reaction index as calculated by (Formula 1) within a range from 0.95 to 1.10.

[Chemical Formula 1]

(1)

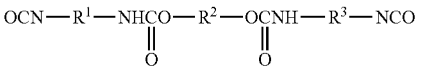

Reaction index=(reaction rate of isocyanate group)×[(number of moles of diisocyanate compound (*B*))/(number of moles of diol compound(*A*))] (Formula 1)

4 Claims, No Drawings

PIGMENT DISPERSION AND AQUEOUS INK FOR INKJET RECORDING

TECHNICAL FIELD

The present invention relates to an aqueous ink for ink jet recording in which a pigment is used as a color material.

BACKGROUND ART

Conventionally, dye inks that use a dye for the color material have been used for the aqueous inks for ink jet recording. There are numerous advantages associated with the dye inks in that they exhibit excellent storage stability, hardly clog the nozzle of an ink jet printer, and the printed matter obtained therefrom is excellent in terms of gloss. However, their disadvantages originating from the dye, such as the poor weather resistance, which makes it impossible to store the printed matter for a long time, and inferior water resistance and light resistance have been pointed out. Accordingly, in recent years, aqueous inks for inkjet recording using a pigment that exhibits excellent weather resistance, water resistance and light resistance (hereafter, abbreviated as an aqueous pigment ink) have been developed.

An aqueous pigment ink is usually a pigment dispersion prepared by homogeneously dispersing pigment particles in an aqueous solvent such as water, and following the recording, forms an ink film containing the pigment particles on a recording medium. Image quality of the material recorded by the aqueous pigment ink largely depends on the color development and gloss of the pigment particles themselves in this ink film, and thus there has been a problem in that the color developing properties and gloss properties of the recorded portion are impaired due to the diffuse reflection of light by the pigment particles in the ink film, when a recording medium, such as a glossy paper, in which a recording surface is smoothed is used. Moreover, there have also been problems of insufficient fixation with respect to the recording medium and poor scratch resistance of the formed images.

In addition, ink jet printing is different from the usual printing method, and the printing process is conducted by discharging an ink from the printer head. The discharge system includes a piezo system and a thermal system. In the thermal system, in particular, since the ink inside the nozzle is boiled with a heater constituted of the heat elements provided in the printer head to discharge the ink droplets, a problem arises in that a phenomenon known as cogation occurs in the heater portion due to the rapid temperature change inside the nozzle so that the liquid is no longer discharged (discharge failure) during the prolonged printing process. Therefore, the ejection stability is also required for the ink to be used.

Currently, a water-based pigment ink that contains a resin component in order to improve the fixation onto the recording medium and the gloss has been studied, and an aqueous ink for inkjet recording to which aqueous polyurethane has been added is known as an ink to satisfy the physical properties to some extent. More specifically, an inkjet recording liquid containing a polyurethane that is formed by having an acetylene glycol type hydrophobic diol known as a surface active agent and a carboxyl group-containing diol as raw materials (for example, refer to Patent Document 1), an ink composition for inkjet printing containing an urethane-modified polyester resin (for example, refer to Patent Document 2), and an ink composition for inkjet printing containing a self-dispersing pigment and a polyurethane dispersing element (for instance, refer to Patent Document 3) have been known.

However, the inkjet recording liquid described in Patent Document 1 had a problem of inferior gloss properties, scratch resistance, or the like of the printed material, especially when a glossy paper was used as a recording medium. In addition, the ink composition for inkjet printing described in Patent Document 2 had problems of inferior ejection stability and poor abrasion properties of the obtained printed material, and the ink composition for inkjet printing described in Patent Document 3 had a problem of inferior ejection stability.

Patent Document 1: Japanese Unexamined Patent Application, First Publication No. Hei 06-279718

Patent Document 2: Japanese Unexamined Patent Application, First Publication No. 2004-300393

Patent Document 3: Published Japanese Translation No. 2005-515289 of the PCT International Publication

SUMMARY OF INVENTION

Technical Problem

The problems to be solved by the present invention and thus the object thereof is to provide an aqueous ink for ink jet recording which is capable of stably discharging ink droplets even during the prolonged printing process in the inkjet printer of a thermal system, and is also capable of obtaining a printed image that exhibits excellent weather resistance, in particular, scratch resistance.

Solution to Problem

The present inventors have discovered that the above-mentioned problem can be solved by using a carboxyl group-containing polyurethane which is designed so that carboxyl groups are homogeneously introduced within the polymer chain of the polyurethane.

In terms of the carboxyl group introduction, the conventional carboxyl group-containing polyurethanes have not been controlled in any way, and carboxyl groups are randomly introduced within the polyurethane chain in most cases.

Although a block type urethane oligomer has been disclosed in Patent Document 1, the object thereof is to control the oligomer segment and the positions of the carboxyl groups have not been identified. In addition, although an aqueous polyurethane dispersing element which is synthesized through an adduct form constituted of acid group-containing diols including the carboxyl group-containing diol and a diisocyanate compound has been disclosed in Patent Document 3, there is no description on the method for synthesizing the adduct form.

The present inventors have determined that the carboxyl groups which are randomly introduced in this manner seriously affect the discharge properties.

In the case of random polymerization, the amount of carboxyl groups introduced in several locations within the molecular chain during the polymerization becomes heterogeneous. Especially when a polymerization process is designed so as to control the molecular weight of the polyurethane to be obtained to a low level, since the amount of introduced carboxyl groups per se for each one molecular chain reduces in theory, some molecular chains may be produced with no carboxyl group introduced. In other words, even if the amount of raw material monomer to be charged is determined by predicting the extent of hydrophilicity in advance, since a portion of the molecular chain of the obtained polyurethane becomes insoluble in water, the degree of solubility partially reduces. Moreover, portions of isocyanate groups and carboxyl groups cause a crosslinking reaction during polymerization to form an unnecessary gel component in water, thereby increasing the molecular weight beyond expectation or disabling the cross-linked carboxyl group to function as a water-dispersion stabilizing group, and thus the water solubility reduces with respect to the amount of raw material monomer added. In addition to these phenomena, the present inventors have also discovered that the ink ejection stability and the printing suitability are considerably impaired by these phenomena.

That is, the present invention provides a pigment dispersion that contains water, an aqueous polymer and a pigment as essential components, and in which the aforementioned aqueous polymer is a carboxyl group-containing polyurethane which is formed by reacting a diol compound (C) and a reaction product, which is mainly composed of a compound represented by general formula (1) and prepared by reacting a dial compound (A) having one or two carboxyl groups within each molecule with a diisocyanate compound (B) and which also has a reaction index as calculated by (Formula 1) within a range from 0.95 to 1.10, or by reacting the aforementioned reaction product, the diol compound (C) and a diisocyanate group (D).

[Chemical Formula 1]

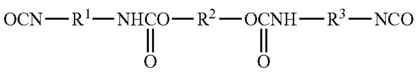

(1)

(In general formula (1), $R^1$ and $R^3$ represent partial structures of the diisocyanate compound (B) from which the isocyanate group has been excluded, and $R^1$ and $R^3$ may be the same or may be different; and $R^2$ represents a partial structure of the aforementioned diol compound (A) having one or two carboxyl groups within each molecule and from which the hydroxyl group has been excluded).

[Eq. 1]

Reaction index=(reaction rate of isocyanate group)× [(number of moles of diisocyanate compound (*B*))/(number of moles of diol compound(*A*))] (Formula 1)

In addition, the present invention provides an aqueous ink for inkjet recording that is formed by using the pigment dispersion described above.

Further, the present invention provides a method for producing an aqueous polymer, which is a method for producing an aqueous polymer to be used in a pigment dispersion that contains water, the aqueous polymer and a pigment as essential components, the method including a step of reacting a diol compound (A) having one or two carboxyl groups within each molecule with a diisocyanate compound (B) and terminating the reaction at the point where the reaction index as calculated by (Formula 1) falls within a range from 0.95 to 1.10, thereby producing a reaction product which is mainly composed of a compound represented by general formula (1), followed by a step of reacting the aforementioned reaction product and a diol compound (C), or the aforementioned reaction product, the diol compound (C) and a diisocyanate group (D).

[Chemical Formula 2]

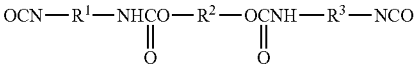

(1)

(In general formula (1), $R^1$ and $R^3$ represent partial structures of the diisocyanate compound (B) from which the isocyanate group has been excluded, and $R^1$ and $R^3$ may be the same or may be different; and $R^2$ represents a partial structure of the aforementioned diol compound (A) having one or two carboxyl groups within each molecule and from which the hydroxyl group has been excluded).

[Eq. 2]

Reaction index=(reaction rate of isocyanate group)× [(number of moles of diisocyanate compound (*B*))/(number of moles of diol compound(*A*))] (Formula 1)

Advantageous Effects of Invention

According to the present invention, an aqueous ink for ink jet recording which is capable of stably discharging ink droplets even during the prolonged printing process in the inkjet printer of a thermal system, is capable of forming an image with no streak, irregularity or ink bleeding, and is also capable of obtaining a printed image that exhibits excellent weather resistance, in particular, scratch resistance.

The discharge properties in a thermal system are particularly favorable especially when the weight average molecular weight of the aforementioned carboxyl group-containing polyurethane is within the range from 10,000 to 50,000.

Furthermore, the ejection stability is superior when the acid value of the aforementioned carboxyl group-containing polyurethane is from 20 to 70 mgKOH/g.

The aforementioned diol compound (A) to be used is preferably dimethylolpropionic acid or dimethylolbutanoic acid since the carboxyl groups can be introduced almost entirely in accordance with the charged amount thereof.

DESCRIPTION OF EMBODIMENTS

Pigment Dispersion Aqueous Polymer (Carboxyl Group-Containing Polyurethane)

The aqueous polymer used in the present invention is a carboxyl group-containing polyurethane which is formed by reacting a dial compound (C) and a reaction product, which is mainly composed of a compound represented by general formula (1) and prepared by reacting a diol compound (A) having one or two carboxyl groups within each molecule with a diisocyanate compound (B) and which also has a reaction index as calculated by (Formula 1) within a range from 0.95 to 1.10, or by reacting the aforementioned reaction product, the diol compound (C) and a diisocyanate group (D).

[Chemical Formula 3]

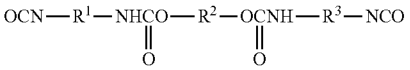

(1)

[Eq. 3]

Reaction index=(reaction rate of isocyanate group)× [(number of moles of diisocyanate compound (*B*))/(number of moles of diol compound(*A*))] (Formula 1)

In general formula (1), $R^1$ and $R^3$ represent partial structures of the diisocyanate compound (B) from which the isocyanate group has been excluded, and $R^1$ and $R^3$ may be the same or may be different; and $R^2$ represents a partial structure of the aforementioned diol compound (A) having one or two carboxyl groups within each molecule and from which the hydroxyl group has been excluded).

Examples of the diol compound (A) used in the present invention and having one or two carboxyl groups within each molecule include esters obtained by the reaction between polyhydric alcohols and polybasic acid anhydrides, and dihydroxyalkanoic acids such as 2,2-dimethylollactic acid, 2,2-dimethylolpropionic acid, 2,2-dimethylolbutanoic acid and 2,2-dimethylolvaleric acid. Examples of preferred compounds include 2,2-dimethylolpropionic acid and 2,2-dimethylolbutanoic acid. Of these, 2,2-dimethylolpropionic acid or 2,2-dimethylolbutanoic acid is preferred due to the availability thereof.

Examples of the diisocyanate compound (B) used in the present invention include aliphatic diisocyanate compounds such as hexamethylene diisocyanate and 2,2,4-trimethylhexamethylene diisocyanate, alicyclic diisocyanate compounds such as isophorone diisocyanate, hydrogenated xylylene diisocyanate and 4,4-cyclohexylmethane diisocyanate, aromatic aliphatic diisocyanate compounds such as xylylene diisocyanate and tetramethylxylene diisocyanate, and aromatic diisocyanate compounds such as tolylene diisocyanate and phenylmethane diisocyanate.

Of these, aliphatic diisocyanate compounds or alicyclic diisocyanate compounds are preferred in view of the light fastness (unlikely fading and discoloration) of the printed images.

In the aforementioned general formula (1), $R^1$ and $R^3$ are preferably partial structures represented by:

[Chemical Formula 4]

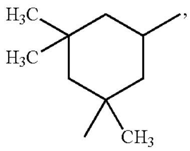,

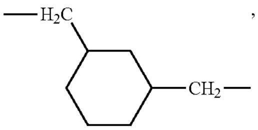,

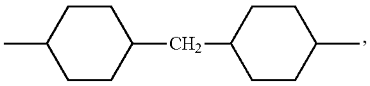,

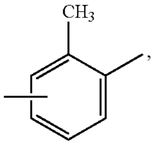,

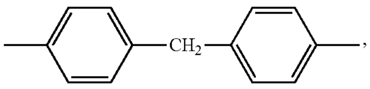, or

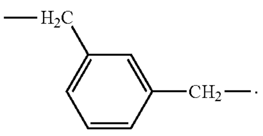.

In addition, in the aforementioned general formula (1), $R^2$ is preferably a partial structure represented by:

[Chemical Formula 5]

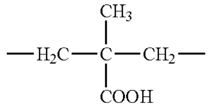 or 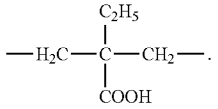.

In the present invention, the reaction index expressed by (Formula 1) refers to an index which becomes 1.0 when a product is obtained by reacting the isocyanate group of diisocyanate compound (B) with the hydroxyl group of diol compound (A) at a molar ratio of 1:1. In other words, when the reaction index is less than 0.95, a large amounts of unreacted diisocyanate compound (B) and diol compound (A) remain and consequently react with a diol compound added in the following step in the same system, and thus carboxyl groups cannot be homogeneously introduced into polyurethane. On the other hand, when the reaction index exceeds 1.10, the crosslinking reaction between the isocyanate group and the carboxyl group proceeds to form cross-linked structures, thereby reducing the water solubility considerably.

In order to obtain the reaction product (hereafter, abbreviated as a reaction product (1)), which is mainly composed of a compound represented by the aforementioned general formula (1) and prepared by reacting the aforementioned diol compound (A) with the aforementioned diisocyanate compound (B) and which also has a reaction index as expressed by (Formula 1) within a range from 0.95 to 1.10, for example, the aforementioned diol compound (A) and the aforementioned diisocyanate compound (B) are added in a solvent with no active hydrogen and the resulting reaction solution is maintained within a range from 60 to 80° C. to allow the reaction to proceed. Examples of preferred solvents herein include dialkyl ethers of glycol compounds, diesters, N-methylpyrrolidone, dimethylformamide, ketones, dioxane, acetic acid esters and halogenated aromatic compounds.

The reaction product (1) can be obtained by monitoring the hydroxyl value of a reactive solution or the quantitative value of the isocyanate group during the reaction and terminating the reaction at a point where the reaction rate reached a certain level, that is, at a point where the reaction index expressed by (Formula 1) falls within the range from 0.95 to 1.10. In terms of the method to terminate the reaction, since it is necessary to allow the isocyanate group to further react with the diol compound afterwards, it is preferable to adopt a method in which the reaction temperature is reduced to a temperature where isocyanate substantially does not react, for example, 30° C. or less.

Here, the quantitative value of the isocyanate group can be determined by the method described in ISO14896 (test method for the isocyanate group content), and the reaction rate of the isocyanate group can be calculated from the value derived by dividing the quantitative value of the isocyanate group in the reaction product with the quantitative value of the isocyanate group prior to the reaction. More specifically, the reaction rate of the isocyanate group can be determined by the formula shown below.

(Reaction rate of the isocyanate group)=1−(quantitative value of the isocyanate group in the reaction product)/(quantitative value of the isocyanate group prior to the reaction). [Eq. 4]

With respect to the aforementioned crosslinking reaction between the isocyanate group and the carboxyl group, it is also possible to speculate from changes in the acid value before and after the reaction of the diisocyanate compound (B) with the dial compound (A).

More specifically, the molar ratio between the aforementioned diol compound (A) and the aforementioned diisocyanate compound (B) is preferably at least within the range from 1:1.7 to 1:2.2, and is particularly preferably 1:2. When the molar ratio is less than 1.7, the content of the compound represented by general formula (1) reduces, the monoisocyanate component in the reaction product (1) increases, and the ratio at which the carboxyl groups are introduced to the polyurethane terminal increases, thereby reducing the water solubility in some cases. In addition, when the molar ratio exceeds 2.2, the amount of the diisocyanate compound (B) becomes excessive, which makes the crosslinking reaction between the isocyanate group and the carboxyl group easy to proceed.

The content of the compound included in the aforementioned reaction product (1) and represented by the aforementioned general formula (1) is preferably at least 80% or more, and is particularly preferably 90% or more, in terms of solid content. When the content of the compound included in the aforementioned reaction product (1) and represented by the aforementioned general formula (1) is less than 80%, it indicates, in other words, that a large amount of monoisocyanate component is present in the reaction product (1), and the ratio at which the carboxyl groups are introduced to the polyurethane terminal increases, thereby reducing the water solubility in some cases.

When the aforementioned reaction product (1) is left standing for a long time, the crosslinking reaction between the isocyanate group and the carboxyl group proceeds to form a cross-linked polymer. Therefore, it is preferable to swiftly perform the next step, that is, to allow the reaction between the aforementioned reaction product (1) and the diol compound (C) or the reaction between the aforementioned reaction product, the diol compound (C) and the diisocyanate compound (D).

It is desirable that the diol compound (C) to be reacted with the aforementioned reaction product (1) be a compound that does not include a carboxyl group, for the sake of designing so that the carboxyl groups are homogeneously introduced within the polymer chain of polyurethane. There are no other particular limitations on the compound, and the compound can be selected appropriately in accordance with the printing suitability of the desired ink. For example, when the scratch resistance is desired in particular, it is preferable that a certain level of softness is provided to the aqueous polymer to be used, preferred examples thereof include polyether polyol and polyester polyol. In addition, since the urethane bond within the carboxyl group-containing polyurethane used in the present invention tends to increase the film hardness in the printed material to be obtained, it is preferable to use a diol compound with a high molecular weight for the sake of reducing the amount of urethane bond within each molecule. However, because the ink discharge properties are adversely affected when the molecular weight is too high, the molecular weight of the diol compound (C) is preferably within the range from 400 to 3,000, and more preferably within a range from 500 to 2,500, on the basis of the number average molecular weight (Note that the number average molecular weight in the present invention is measured by gel permeation chromatography and represented as a polystyrene equivalent value, and hereafter abbreviated as Mn unless stated otherwise).

Examples of these dial compounds (C) include polyester polyol, polyether polyol, polyhydroxy polycarbonate, polyhydroxy polyacetal, polyhydroxy polyacrylate, polyhydroxy polyester amide and polyhydroxy polythioether. Of these, polyester polyol, polyether polyol and polyhydroxy polycarbonate are preferred. Only one type of these diol compounds may be reacted alone or several kinds thereof may be mixed and reacted.

In addition, other than the aforementioned high molecular weight diol compound, a low molecular weight diol compound may be combined where appropriate, for the sake of adjusting the film hardness in the printed material or the like. Examples thereof include ethylene glycol, diethylene glycol, propylene glycol, dipropylene glycol, 1,2-propanediol, 1,3-propanediol and 1,4-butanediol.

In addition, as the diisocyanate compound (D), the diisocyanate compounds used as the aforementioned diisocyanate compound (B) can be used where appropriate.

Further, a chain elongating agent can be used in the present invention if necessary. As the chain elongating agent in such cases, for example, at least one of diols, such as ethylene glycol, propylene glycol, 1,4-butanediol, 1,6-hexanediol, 1,9-nonanediol, 1,4-bis(β-hydroxyethoxy)benzene, 1,4-cyclohexanediol and xylylene glycol, and diamines, such as ethylenediamine, propylenediamine, xylylenediamine, isophoronediamine, 4,4'-diaminodiphenylmethane, tolylenediamine and 4,4' diaminodicyclohexylmethane, can be used.

In order to allow the reaction between the aforementioned reaction product (1) and the diol compound (C) or the reaction between the aforementioned reaction product, the diol compound (C) and the diisocyanate compound (D), a known method may be adopted.

When the aforementioned reaction product (1) is reacted with the diol compound (C), it is possible to cause the reaction by mixing and stirring the aforementioned reaction product (1) and the diol compound (C) in a solvent.

In addition, when the aforementioned reaction product (1), the diol compound (C) and the diisocyanate compound (D) are reacted, the diisocyanate compound (D) may be added after allowing the aforementioned reaction product (1) to react with the dial compound (C) while mixing and stirring in a solvent, or a mixture of the diol compound (C) and the diisocyanate compound (D) and the aforementioned reaction product (1) may be mixed and stirred in a solvent to allow the reaction to proceed. Further, it is also possible to further add the diol compound (C) once again for the sake of increasing the molecular weight or the like.

More specifically, the reaction is carried out, for example, under the condition of 60 to 110° C. in the aforementioned solvent with no active hydrogen for 10 to 20 hours. In such cases, a known urethanated catalyst such as dibutyltin dilaurate may be used. Thereafter, the obtained mixture of the carboxyl group-containing polyurethane and an organic solvent gradually undergoes a phase inversion from the oil phase to the water phase using water and a basic substance, followed by the solvent removal, thereby preparing a carboxyl group-containing polyurethane serving as an aqueous polymer.

Examples of the basic substance used in the phase inversion include organic amines such as ammonia, ethylamine, trimethylamine, triethylamine, triisopropylamine, tributylamine, triethanolamine, N-methyldiethanolamine, N-phenyldiethanolamine, monoethanolamine, dimethylethanolamine, diethylethanolamine, morpholine, N-methylmorpholine and 2-amino-2-ethyl-1-propanol, alkali metals such as lithium, potassium and sodium, and inorganic alkali compounds such as sodium hydroxide and potassium hydroxide. Although the amount of the basic substance used is not particularly limited and can be determined appropriately in accordance with the physical properties of the carboxyl group-containing polyurethane, the basic substance is usually used in an amount that is required to neutralize 70 to 130% of the acid value of the polyurethane.

It is preferable that the carboxyl group-containing polyurethane obtained in this manner have an acid value of 20 to 70 mgKOH/g since the ejection stability of the prepared aqueous ink for inkjet recording is favorable, and the quality of printed material, such as the scratch resistance, also becomes favorable.

In addition, the weight average molecular weight of the aforementioned carboxyl group-containing polyurethane is preferably from 10,000 to 50,000, and more preferably from 20,000 to 50,000 (Note that the weight average molecular weight in the present invention is measured by gel permeation chromatography and represented as a polystyrene equivalent value, and hereafter abbreviated as Mw unless stated otherwise). When Mw is less than 10,000, the pigment fixation onto the recording medium may become poor and the scratch resistance of the printed images may be deteriorated. On the other hand, when Mw exceeds 50,000, the viscosity of the prepared aqueous ink for inkjet recording may increase and the ejection stability may decline.

An aqueous polymer prepared from the carboxyl group-containing polyurethane that is used in the present invention forms an aqueous dispersion. The particle size of the aqueous dispersion is preferably less than 50 nm. When the particle size is 50 nm or larger, dispersion stability of the aqueous dispersion becomes unsatisfactory, and the carboxyl group-containing polyurethane may be precipitated from the ink to cause cogation when ink is discharged for a long time.

Here, the particle size can be measured through a known centrifugal sedimentation method, a laser diffraction method (light scattering method), an ESA method, a capillary method, an electron microscopic method, or the like. The measurement by the Microtrack UPA instrument employing a dynamic light scattering method is preferred.

Although the amount of the aforementioned carboxyl group-containing polyurethane added in the pigment dispersion of the present invention differs depending on the pigment mixing ratio, it is preferably from 20 to 200 parts by mass, and more preferably from 30 to 70 parts by mass with respect to 100 parts by mass of the pigment. Especially when used as an aqueous ink for inkjet recording, the quality of printed material such as the scratch resistance reduces if the amount of the aforementioned carboxyl group-containing polyurethane added is small, whereas the ejection stability of ink may decline if the amount added is too large.

(Pigment)

The aforementioned aqueous polymer can also be characterized by exhibiting excellent pigment dispersibility and ejection stability without being adversely affected by the type of pigments. Examples of the pigments used for preparing a pigment dispersion include inorganic pigments such as barium sulfate, lead sulfate, titanium oxide, yellow lead, red oxide, chromium oxide and carbon black, anthraquinone-based pigments, perylene-based pigments, disazo-based pigments, phthalocyanine-based pigments, isoindoline-based pigments, dioxazine-based pigments, quinacridone-based pigments, perinone-based pigments and benzimidazolone-based pigments. These pigments may be used alone or may be mixed for use.

As a black pigment, it is preferable to use carbon blacks such as furnace black, lamp black, acetylene black and channel black, titanium blacks, or the like which exhibits excellent light resistance and high hiding power.

Furthermore, among the typical organic pigments for the three primary colors, i.e., cyan, magenta and yellow, the pigments which can be suitably used in the present invention are listed below.

Examples of cyan pigments include C. I. Pigment Blue 1, C. I. Pigment Blue 2, C. I. Pigment Blue 3, C. I. Pigment Blue 15, C. I. Pigment Blue 15:1, C. I. Pigment Blue 15:3, C. I. Pigment Blue 15:4, C. I. Pigment Blue 16, C. I. Pigment Blue 22 and C. I. Pigment Blue 60.

Examples of magenta pigments include C. I. Pigment Red 5, C. I. Pigment Red 7, C. I. Pigment Red 12, C. I. Pigment Red 48, C. I. Pigment Red 48:1, C. I. Pigment Red 57, C. I. Pigment Red 112, C. I. Pigment Red 122, C. I. Pigment Red 123, C. I. Pigment Red 146, C. I. Pigment Red 168, C. I. Pigment Red 184, C. I. Pigment Red 202 and C. I. Pigment Violet 19.

Examples of yellow pigments include C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 109, C. I. Pigment Yellow 114, C. I. Pigment Yellow 128, C. I. Pigment Yellow 129, C. I. Pigment Yellow 138, C. I. Pigment Yellow 151, C. I. Pigment Yellow 154 and C. I. Pigment Yellow 155.

In terms of the particle size of the aforementioned pigments, the primary particle size is preferably within the range from 1 to 500 nm, and more preferably within the range from 20 to 200 nm. In addition, the particle size of pigments after being dispersed in a medium is preferably within the range from 10 to 300 nm, and more preferably within the range from 50 to 150 nm. The primary particle size of pigments can be measured using an electron microscope, or by an adsorption method through gas or a solute, an air circulation method, an X-ray small angle scattering method, or the like. The pigment particle size following dispersion can be measured through a known centrifugal sedimentation method, a laser diffraction method (light scattering method), an ESA method, a capillary method, an electron microscopic method, or the like.

(Water)

The water used in the present invention may be consisted of water alone or may be a mixed solvent of water and a water-soluble organic solvent that is compatible with water. Examples of the water-soluble organic solvent include ketones such as the acetone, methyl ethyl ketone, methyl butyl ketone and methyl isobutyl ketone; alcohols such as methanol, ethanol, 2-propanol, 2-methyl-1-propanol, 1-butanol and 2-methoxyethanol; ethers such as tetrahydrofuran, 1,4-dioxane and 1,2-dimethoxyethane; and amides such as dimethylformamide and N-methylpyrrolidone, and it is particularly preferable to use a compound selected from the group consisting of ketones having 3 to 6 carbon atoms and alcohols having 1 to 5 carbon atoms.

(Other Components: Resin for Pigment Dispersion)

Since the carboxyl group-containing polyurethane used in the present invention has a capacity to disperse pigments, it may be used alone as a pigment dispersing resin, or a resin (hereafter abbreviated as a resin for pigment dispersion) which have been used as a general-purpose pigment dispersant can also be used in combination. Alternatively, it may also be used as a vehicle. When the resins are used in combination, the order to add the carboxyl group-containing polyurethane and the resin for pigment dispersion used is not particularly limited and can be changed appropriately in accordance with the purpose. For example, the pigment dispersion of the present invention prepared by dispersing a pigment with the carboxyl group-containing polyurethane can be directly diluted with a solvent and used as an ink. Alternatively the carboxyl group-containing polyurethane used in the present invention may be added afterwards to a pigment dispersing element, which is dispersed with a general-purpose resin for pigment dispersion, to prepare the pigment dispersion of the present invention.

As the general-purpose resin for pigment dispersion, an aqueous resin suitable for preparing a pigment dispersing element is favorable. Preferred examples thereof include polyvinyl alcohols, polyvinylpyrrolidones, acrylic resins such as acrylic acid-acrylate ester copolymers, styrene-acrylic resins such as styrene-acrylic acid copolymers, styrene-methacrylic acid copolymers, styrene-methacrylic acid-acrylate ester copolymers, styrene-α-methylstyrene-acrylic acid copolymers and styrene-α-methylstyrene-acrylic acid-acrylate ester copolymers, styrene-maleic acid copolymers, styrene-maleic anhydride copolymers, vinylnaphthalene-acrylic acid copolymers, and the salts of these aqueous resins.

Examples of the compounds for forming the aforementioned salt of the copolymer include alkali metal hydroxides such as sodium hydroxide, potassium hydroxide and lithium hydroxide, diethylamine, ammonia, ethylamine, triethylamine, propylamine, isopropylamine, dipropylamine, butylamine, isobutylamine, triethanolamine, diethanolamine, aminomethylpropanol and morpholine. The amount of compound used for forming these salts is preferably equal to or more than the neutralization equivalent of the aforementioned copolymer.

These aqueous resins may be used alone or may be used by mixing two or more types thereof. It should be noted that the form of the aqueous resin used herein is not particularly limited and may be a random copolymer, a block copolymer, or the like.

Especially when preparing the aqueous ink for inkjet recording, the Mw of the aforementioned resin for pigment dispersion is preferably within the range from 6,000 to 20,000 in order to suppress the cogation in the heater portion and to obtain an aqueous ink exhibiting excellent ejection stability. When the Mw is 6,000 or less, the dispersion stability of aqueous ink per se may be reduced. On the other hand, when the Mw exceeds 20,000, the viscosity of aqueous ink tends to increase and also the dispersion stability tends to decline. Moreover, the cogation in the heater portion becomes worse and may become a factor for causing the discharge failure of ink droplets from the nozzle end in an inkjet printer of a thermal system.

The amount of the aforementioned resin for pigment dispersion added is preferably 1 to 100 parts by mass and more preferably 2 to 70 parts by mass, with respect to 100 parts by mass of the pigment. In addition, the acid value of the aforementioned resin for pigment dispersion is preferably from 50 to 300 mgKOH/g.

Especially when preparing the aqueous ink for inkjet recording, it is preferable to use the salt of a styrene-(meth)acrylic acid copolymer from the viewpoint of further improving the dispersion stability and the like. When it is prepared through the addition of the aforementioned carboxyl group-containing polyurethane to an aqueous dispersion, which is obtained by dispersing a pigment in water in advance with the salt of a styrene-(meth)acrylic acid copolymer, the ink discharge properties become excellent, and also print images exhibiting superior scratch resistance can be obtained.

The method for obtaining the pigment dispersion of the present invention is not particularly limited, and a known method can be adopted. For example, the pigment dispersion of the present invention prepared by dispersing a pigment in water or in an aqueous solvent that contains water with the aforementioned carboxyl group-containing polyurethane can be directly diluted with a solvent and used as an ink. Alternatively, the carboxyl group-containing polyurethane used in the present invention may be added afterwards to a pigment dispersing element, which is dispersed with a general-purpose resin for pigment dispersion, followed by the concentration adjustment with a solvent if necessary, to prepare the pigment dispersion of the present invention.

As a stirring/dispersing device for dispersing pigments, for example, various known dispensers such as an ultrasonic homogenizer, a high-pressure homogenizer, a paint shaker, a ball mill, a roll mill, a sand mill, a sand grinder, a dyno mill, dispermat, an SC mill, a nanomizer, or the like can be used.

(Aqueous Ink for Inkjet Recording)

The aqueous ink for inkjet recording of the present invention can be prepared by diluting the pigment dispersion of the present invention with water or an aqueous solvent that contains water, and adding thereto a drying suppressor, a penetrant, or other additives if necessary.

The drying suppressor provides an effect to suppress the drying of the aqueous ink for inkjet recording at the port of the injection nozzle of an inkjet printer head. A water-soluble organic solvent having a boiling point which is equal to or higher than the boiling point of water is usually used.

Examples of the water-soluble organic solvent that can be used as a drying suppressor include polyhydric alcohols such as ethylene glycol, diethylene glycol, polyethylene glycol and glycerin, pyrrolidones such as N-methyl-2-pyrrolidone and 2-pyrrolidone, amides, dimethyl sulfoxide and imidazolidinone. When the solvent is water, the amount of the dry suppressor used is preferably within the range from 1 to 150 parts with respect to 100 parts of water.

The penetrant is used so as to facilitate the aqueous ink for inkjet recording, which is jetted from the ink jet nozzle of an inkjet printer head and attached onto a recording medium, to penetrate into the recording medium. Due to the use of a penetrant, an aqueous solvent rapidly penetrates into the recording medium, recorded materials that include images with less bleeding can be obtained.

Examples of the penetrant used in the present invention include polyhydric alcohols such as ethylene glycol, 1,2,6-hexanetriol, thiodiglycol, hexylene glycol and diethylene glycol, diols such as pentanediol and hexanediol, glycol ethers such as propylene glycol laurate, low alkyl ethers of polyhydric alcohols such as diethylene glycol ethyl ether and triethylene glycol monoethyl ether, low alcohols such as ethanol and isopropyl alcohol, glycol ethers such as diethylene glycol-N-butyl ether, and water-soluble organic solvents such as propylene glycol derivatives. These can be used alone or by mixing two or more types thereof. By mixing two or more types for use, more favorable permeability can be achieved at times.

For the sake of adjusting the physical properties such as the ink surface tension, a certain amount of surface active agent may be added to the aqueous ink for inkjet recording of the present invention. The surface active agent is not particularly limited and may be selected appropriately from the known surface active agents including anionic surface active agent such as alkylbenzenesulfonate and higher fatty acid salts, nonionic surface active agents such as polyoxyethylenealkyl ethers and polyoxyethylene fatty acid esters, and other cationic surface active agents and amphoteric surface active agents. These surface active agents can be used alone or can be used by mixing two or more types thereof.

Examples of other additives include antiseptics, antifungal agents and chelating agents for preventing the clogging of nozzles.

When coarse particles are present in the aqueous ink for inkjet recording, they cause the clogging of ink jet nozzle in an inkjet printer. Therefore, it is preferable to remove the coarse particles by centrifugal separation, filtration, or the like, following the dispersion treatment.

The aqueous ink for inkjet recording of the present invention obtained in this manner exhibits superior ink storage stability and excellent discharge properties from the ink jet nozzle of an inkjet printer head, and the ink film formed on top of a recording medium by using the above ink exhibits high levels of density and gloss as well as excellent scratch resistance.

EXAMPLES

The present invention will be described in detail below using a series of Examples. However, these Examples are provided for specifically explaining the present invention, and the embodiments of the present invention are not limited thereto.

Further, the terms "parts" and "%" used in the following Synthesis Examples, Examples and Comparative Examples are both based on mass.

<Quantitative Determination of Isocyanate Group>

0.1 g of a sample solution was added and dissolved in 40 ml of a dimethylformamide solution of 0.01 N di-n-butylamine, and quantitative determination was then carried out through the neutralization titration with a methanol solution of 0.01 N hydrochloric acid while using bromophenol blue as an indicator.

<Quantitative Determination of Acid Value>

1.0 g of a sample solution was diluted with 10 g of methyl ethyl ketone and then added and dissolved in 40 ml of a mixed solvent of toluene and methanol (toluene:methanol=7:3), and quantitative determination was then carried out through the neutralization titration with a methanol solution of 0.1 N potassium hydroxide while using phenolphthalein as an indicator.

(Determination of Pigment Particle Size in Aqueous Ink for Inkjet Recording)

After diluting a sample ink by 1,000-fold due to the addition of water, particle size of the pigment dispersed in the sample ink was measured using a particle size analyzer ("Microtrack UPA 150" manufactured by Leeds & Northrup Co.).

Synthesis Example 1

Synthesis of Reaction Product (1-1)

A four-necked flask fitted with a thermometer, a stirrer, a nitrogen inlet tube and a cooling tube was charged with 482 g of methyl ethyl ketone (hereafter, abbreviated as MEK), 134 g of dimethylolpropionic acid (hereafter, abbreviated as DMPA) and 348 g of tolylene diisocyanate to allow the reaction to proceed under an atmosphere of nitrogen at 70° C. for 1.5 hours, thereby yielding a reaction product (1-1). The quantitative value of the isocyanate group in the reaction product (1-1) was 8.73, and the reaction index was 0.998.

Synthesis Example 2

Synthesis of Reaction Product (1-2)

A four-necked flask fitted with a thermometer, a stirrer, a nitrogen inlet tube and a cooling tube was charged with 660 g of MEK, 134 g of DMPA and 524 g of 4,4-cyclohexylmethane diisocyanate (hereafter, abbreviated as H2MDI) to allow the reaction to proceed under an atmosphere of nitrogen at 70° C. for 1.5 hours, thereby yielding a reaction product (1-2). The quantitative value of the isocyanate group in the reaction product (1-2) was 6.53, and the reaction index was 0.980.

Synthesis Example 3

Synthesis of Reaction Product (1-3)

A four-necked flask fitted with a thermometer, a stirrer, a nitrogen inlet tube and a cooling tube was charged with 592 g of MEK, 147 g of DMPA and 444 g of isophorone diisocyanate (IPDI) to allow the reaction to proceed under an atmosphere of nitrogen at 70° C. for 2 hours, thereby yielding a reaction product (1-3). The quantitative value of the isocyanate group in the reaction product (1-3) was 6.53, and the reaction index was 0.977.

Synthesis Example 4

Synthesis of Reaction Product (1-4)

A four-necked flask fitted with a thermometer, a stirrer, a nitrogen inlet tube and a cooling tube was charged with 592 g of MEK, 147 g of DMPA and 444 g of IPDI to allow the reaction to proceed under an atmosphere of nitrogen at 70° C. for 2.5 hours, thereby yielding a reaction product (1-4). The quantitative value of the isocyanate group in the reaction product (1-4) was 5.82, and the reaction index was 1.068.

Synthesis Example 5

Synthesis of Reaction Product (1-5)

A four-necked flask fitted with a thermometer, a stirrer, a nitrogen inlet tube and a cooling tube was charged with 622 g of MEK, 134 g of DMPA and 488 g of IPDI to allow the reaction to proceed under an atmosphere of nitrogen at 70° C. for 2 hours, thereby yielding a reaction product (1-5). The quantitative value of the isocyanate group in the reaction product (1-5) was 8.17, and the reaction index was 0.990.

Comparative Synthesis Example 1

Synthesis of Reaction Product (Comparison 1-1)

A four-necked flask fitted with a thermometer, a stirrer, a nitrogen inlet tube and a cooling tube was charged with 290 g of MEK, 67 g of DMPA and 222 g of IPDI to allow the reaction to proceed under an atmosphere of nitrogen at 70° C. for 1 hour, thereby yielding a reaction product (comparison 1-1). The quantitative value of the isocyanate group in the reaction product (comparison 1-1) was 4.49, and the reaction index was 0.760.

Comparative Synthesis Example 2

Synthesis of Reaction Product (Comparison 1-2)

A four-necked flask fitted with a thermometer, a stirrer, a nitrogen inlet tube and a cooling tube was charged with 290 g of MEK, 67 g of DMPA and 222 g of IPDI to allow the reaction to proceed under an atmosphere of nitrogen at 70° C. for 6 hours, thereby yielding a reaction product (comparison 1-2). The quantitative value of the isocyanate group in the reaction product (comparison 1-2) was 3.11, and the reaction index was 1.140.

The physical property values of the aforementioned reaction products (1-1) to (1-5) and (comparison 1-1) to (comparison 1-2) are indicated in Table 1.

TABLE 1

| Table 1 Reaction product | Quantitative value of isocyanate group before the reaction | Quantitative value of isocyanate group after the reaction | Reaction rate of isocyanate group | NCO/OH* | Reaction index |
|---|---|---|---|---|---|
| 1-1 | 17.43 | 8.73 | 0.499 | 2.00 | 0.998 |
| 1-2 | 12.75 | 6.50 | 0.490 | 2.00 | 0.980 |
| 1-3 | 14.20 | 6.53 | 0.540 | 1.81 | 0.977 |
| 1-4 | 14.20 | 5.82 | 0.590 | 1.81 | 1.068 |
| 1-5 | 18.00 | 8.17 | 0.450 | 2.20 | 0.990 |
| Comparison 1-1 | 7.24 | 4.49 | 0.380 | 2.00 | 0.760 |
| Comparison 1-2 | 7.24 | 3.11 | 0.570 | 2.00 | 1.140 |

*Values calculated by the formula: ((number of moles of diisocyanate compound (B))/(number of moles of diol compound (A))) are shown.

Synthesis Example 6

Synthesis of Carboxyl Group-Containing Polyurethane A

A four-necked flask fitted with a thermometer, a stirrer, a nitrogen inlet tube and a cooling tube was charged with 243 g of the reaction product (1-1) obtained in Synthesis Example 1, 243 g of poly(oxytetramethylene)glycol having an Mn of 650 (OH group equivalent: 173), 0.001 g of dibutyltin dilaurate (hereafter, abbreviated as DBTDL) and 243 g of MEK to allow the reaction to proceed under an atmosphere of nitrogen at 80° C. for 16 hours, and the reaction was then terminated by adding 5 g of methanol, thereby yielding an MEK solution of a carboxyl group-containing polyurethane A having an acid value of 38 and a weight average molecular weight of 12,000 in terms of the polystyrene equivalent value. The obtained solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution was colorless and transparent, and the particle size was less than 50 nm.

Synthesis Example 7

Synthesis of Carboxyl Group-Containing Polyurethane B

A four-necked flask fitted with a thermometer, a stirrer, a nitrogen inlet tube and a cooling tube was charged with 330 g of the reaction product (1-2) obtained in Synthesis Example 2, 260 g of poly(oxytetramethylene)glycol having an Mn of 1,000 (OH group equivalent: 112), 0.001 g of DBTDL and 260 g of MEK to allow the reaction to proceed under an atmosphere of nitrogen at 80° C. for 16 hours, and the reaction was then terminated by adding 5 g of methanol, thereby yielding a carboxyl group-containing polyurethane B having an acid value of 33 and an Mw of 50,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution was colorless and transparent, and the particle size was less than 50 nm.

Synthesis Example 8

Synthesis of Carboxyl Group-Containing Polyurethane C

A four-necked flask fitted with a thermometer, a stirrer, a nitrogen inlet tube and a cooling tube was charged with 296 g of the reaction product (1-3) obtained in Synthesis Example 3, 225 g of poly(oxytetramethylene)glycol having an Mn of 1,000 (OH group equivalent: 112), 0.001 g of DBTDL and 230 g of MEK to allow the reaction to proceed under an atmosphere of nitrogen at 80° C. for 16 hours, and the reaction was then terminated by adding 5 g of methanol, thereby yielding a carboxyl group-containing polyurethane C having an acid value of 41 and an Mw of 30,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution was colorless and transparent, and the particle size was less than 50 nm.

Synthesis Example 9

Synthesis of Carboxyl Group-Containing Polyurethane D

A four-necked flask fitted with a thermometer, a stirrer, a nitrogen inlet tube and a cooling tube was charged with 296 g of the reaction product (1-4) obtained in Synthesis Example 4, 225 g of poly(oxytetramethylene)glycol having an Mn of 1,000 (OH group equivalent: 112), 0.001 g of DBTDL and 230 g of MEK to allow the reaction to proceed under an atmosphere of nitrogen at 80° C. for 16 hours, and the reaction was then terminated by adding 5 g of methanol, thereby yielding a carboxyl group-containing polyurethane D having an acid value of 41 and an Mw of 30,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution was colorless and transparent, and the particle size was less than 50 mm.

Synthesis Example 10

Synthesis of Carboxyl Group-Containing Polyurethane E

A four-necked flask fitted with a thermometer, a stirrer, a nitrogen inlet tube and a cooling tube was charged with 330 g of the reaction product (1-2) obtained in Synthesis Example 2, 169 g of polyester polyol having an Mn of 650 (OH group equivalent: 173), 0.001 g of DBTDL and 170 g of MEK to allow the reaction to proceed under an atmosphere of nitrogen at 80° C. for 20 hours, and the reaction was then terminated by adding 5 g of methanol, thereby yielding a carboxyl group-containing polyurethane E having an acid value of 42 and an Mw of 60,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution was colorless and transparent, and the particle size was less than 50 nm.

Synthesis Example 11

Synthesis of Carboxyl Group-Containing Polyurethane F

A four-necked flask fitted with a thermometer, a stirrer, a nitrogen inlet tube and a cooling tube was charged with 243 g of the reaction product (1-1) obtained in Synthesis Example 1, 270 g of poly(oxytetramethylene)glycol having an Mn of 650 (OH group equivalent: 173), 0.001 g of DBTDL and 270 g of MEK to allow the reaction to proceed under an atmosphere of nitrogen at 80° C. for 10 hours, and the reaction was then terminated by adding 5 g of methanol, thereby yielding a carboxyl group-containing polyurethane F having an acid value of 36 and an Mw of 9,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution was colorless and transparent, and the particle size was less than 50 nm.

Synthesis Example 12

Synthesis of Carboxyl Group-Containing Polyurethane G

A four-necked flask fitted with a thermometer, a stirrer, a nitrogen inlet tube and a cooling tube was charged with 243 g of the reaction product (1-1) obtained in Synthesis Example 1, 667 g of poly(oxytetramethylene)glycol polyester polyol having an Mn of 2,000 (OH group equivalent: 56), 12.3 g of IPDI, 0.001 g of DBTDL and 680 g of MEK to allow the reaction to proceed under an atmosphere of nitrogen at 80° C. for 16 hours, and the reaction was then terminated by adding 5 g of methanol, thereby yielding a carboxyl group-containing polyurethane G having an acid value of 17 and an Mw of 38,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution was a transparent solution with a fluorescent color, and the particle size was 80 nm.

Synthesis Example 13

Synthesis of Carboxyl Group-Containing Polyurethane H

A four-necked flask fitted with a thermometer, a stirrer, a nitrogen inlet tube and a cooling tube was charged with 268 g of the reaction product (1-3) obtained in Synthesis Example 3, 45 g of polypropylene glycol having an Mn of 400 (OH group equivalent 281), 7.2 g of ethylene glycol, 0.001 g of DBTDL and 320 g of MEK to allow the reaction to proceed under an atmosphere of nitrogen at 80° C. for 16 hours, and the reaction was then terminated by adding 5 g of methanol, thereby yielding a carboxyl group-containing polyurethane H having an acid value of 75 and an Mw of 30,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution was colorless and transparent, and the particle size was less than 50 nm.

Synthesis Example 14

Synthesis of Carboxyl Group-Containing Polyurethane I

A four-necked flask fitted with a thermometer, a stirrer, a nitrogen inlet tube and a cooling tube was charged with 293 g of the reaction product (1-5) obtained in Synthesis Example 5, 450 g of poly(oxytetramethylene)glycol having an Mn of 2,000 (OH group equivalent: 56), 0.001 g of DBTDL and 450 g of MEK to allow the reaction to proceed under an atmosphere of nitrogen at 80° C. for 16 hours, and the reaction was then terminated by adding 5 g of methanol, thereby yielding a carboxyl group-containing polyurethane I having an acid value of 28 and an Mw of 40,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution was colorless and transparent, and the particle size was less than 50 nm.

Comparative Synthesis Example 3

Synthesis of Carboxyl Group-Containing Polyurethane H-J

A four-necked flask fitted with a thermometer, a stirrer, a nitrogen inlet tube and a cooling tube was charged with 266 g of IPDI, 67 g of DMPA, 325 g of polyester polyol having an Mn of 650 (OH group equivalent: 173), 0.001 g of DBTDL and 646 g of MEK to allow the reaction to proceed under an atmosphere of nitrogen at 80° C. for 10 hours, and the reaction was then terminated by adding 15 g of ethylenediamine as a chain elongating agent, thereby yielding a carboxyl group-containing polyurethane H-J having an acid value of 45 and an Mw of 80,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution had a milky white color, and the particle size was 200 nm.

Comparative Synthesis Example 4

Synthesis of Carboxyl Group-Containing Polyurethane H-K

A four-necked flask fitted with a thermometer, a stirrer, a nitrogen inlet tube and a cooling tube was charged with 105 g of IPDI, 67 g of DMPA and 172 g of MEK to allow the reaction to proceed under an atmosphere of nitrogen at 70° C. for 4 hours, thereby yielding a urethane oligomer I1. A four-necked flask was charged with 117 g of IPDI, 357 g of poly (oxytetramethylene)glycol having an Mn of 650 (OH group equivalent: 173), 0.001 g of DBTDL and 474 g of MEK to allow the reaction to proceed under an atmosphere of nitrogen at 80° C. for 6 hours, thereby yielding a urethane oligomer I2.948 g of the aforementioned urethane oligomer I2 solution was charged with 344 g of urethane oligomer I1 to allow the reaction to proceed under an atmosphere of nitrogen at 80° C. for 10 hours, and the reaction was then terminated by adding 5 g of methanol, thereby yielding a carboxyl group-containing polyurethane H-K having an acid value of 45 and an Mw of 12,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution had a milky white color, and the particle size was 100 nm.

Comparative Synthesis Example 5

Synthesis of Carboxyl Group-Containing Polyurethane H-L

A four-necked flask fitted with a thermometer, a stirrer, a nitrogen inlet tube and a cooling tube was charged with 222 g of IPDI, 330 g of poly(oxytetramethylene)glycol having an Mn of 650 (OH group equivalent: 173) and 0.001 g of DBTDL to allow the reaction to proceed under an atmosphere of nitrogen at 100° C. for 2 hours. Subsequently, 67 g of DMPA and 620 g of MEK were charged to allow the reaction to proceed under an atmosphere of nitrogen at 80° C. for 16 hours, and the reaction was then terminated by adding 5 g of methanol, thereby yielding a carboxyl group-containing polyurethane H-L having an acid value of 45 and an Mw of 50,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution had a milky white color, and the particle size was 150 nm.

Comparative Synthesis Example 6

Synthesis of Carboxyl Group-Containing Polyurethane H-M

A four-necked flask fitted with a thermometer, a stirrer, a nitrogen inlet tube and a cooling tube was charged with 579 g of the reaction product (comparison 1-1) obtained in Comparative Synthesis Example 1, 357 g of poly(oxytetramethylene)glycol having an Mn of 650 (OH group equivalent: 173), 0.001 g of DBTDL and 357 g of MEK to allow the reaction to proceed under an atmosphere of nitrogen at 80° C. for 16 hours, and the reaction was then terminated by adding 5 g of methanol, thereby yielding a carboxyl group-containing polyurethane H-M having an acid value of 45 and an Mw of 32,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution had a milky white color, and the particle size was 150 nm.

Comparative Synthesis Example 7

Synthesis of Carboxyl Group-Containing Polyurethane H-N

A four-necked flask fitted with a thermometer, a stirrer, a nitrogen inlet tube and a cooling tube was charged with 579 g of the reaction product (comparison 1-2) obtained in Comparative Synthesis Example 2, 357 g of poly(oxytetramethylene)glycol having an Mn of 650 (OH group equivalent: 173), 0.001 g of DBTDL and 357 g of MEK to allow the reaction to proceed under an atmosphere of nitrogen at 80° C. for 16 hours, and the reaction was then terminated by adding 5 g of methanol, thereby yielding a carboxyl group-containing polyurethane H-N having an acid value of 41 and an Mw of 42,000. The obtained resin solution was neutralized with sodium hydroxide in the same molar amount as the charged amount of DMPA, and the phase inversion emulsification was conducted by the addition of water. MEK was then eliminated by the solvent removal under reduced pressure, followed by the addition of water to form an aqueous solution with a solid content of 20% based on mass. The aqueous solution had a milky white color, and the particle size was 200 nm.

Example 1

Adjustment of Aqueous Pigment Dispersing Element (a)

6 parts of a methyl ethyl ketone solution of benzyl methacrylate-methacrylic acid copolymer having a solid content of 50% (with an acid value of 100 and a weight average molecular weight of 20,000), 6.0 parts of a 5% potassium hydroxide aqueous solution, 10 parts of a phthalocyanine-based pigment "Fastogen (registered trademark) Blue TGR" (manufactured by DIC Corporation) and 23.8 parts of water were charged and mixed in a 250 mL plastic bottle. (Here, the copper phthalocyanine-based pigment was charged in 10 parts, the resin was charged in an amount so as to achieve a ratio of 30% by mass with respect to the pigment in terms of the non-volatile content, the 5% potassium hydroxide aqueous solution was charged in an amount so as to neutralize the acid value of the resin by 100% and the water was charged in an amount necessary for making the non-volatile content of the mixed liquid to become 30%, respectively.)

The mixed liquid was dispersed for 2 hours with a paint conditioner (using zirconia beads having a diameter of 0.5 mm). Following the dispersion, the liquid obtained by removing the zirconia beads therefrom was evaporated using an evaporator to distill off methyl ethyl ketone, and was then subjected to a centrifugal separation (8,200 G, 30 minutes) to remove coarse particles, followed by the addition of pure water to adjust the non-volatile content, thereby yielding an aqueous pigment dispersing element (a) with a non-volatile content of 20%. The particle size of the obtained pigment dispersing element was 110 nm.

The aqueous pigment dispersing element (a) and the aqueous solution of the carboxyl group-containing polyurethane A obtained in Synthesis Example 6 were used and adjusted in accordance with the following composition, followed by the filtration using a filter with a pore size of 6 μm, thereby preparing an aqueous ink for inkjet recording (a-A) of a thermal system with a pigment concentration of 4%.

| | |
|---|---|
| Aqueous pigment dispersing element (a) | 13.0 parts |
| Aqueous carboxyl group-containing polyurethane solution A | 3.8 parts |
| Triethylene glycol monobutyl ether | 4.0 parts |
| 2-pyrrolidinone | 4.0 parts |
| Glycerin | 1.5 parts |
| Surfynol 440 (manufactured by Air Products and Chemicals Inc.) | 0.3 parts |
| Water | 23.4 parts |

Examples 2 to 9

Aqueous inks for inkjet recording (a-B) to (a-I) were prepared by conducting the same operation as that described in Example 1 with the exception that, instead of the aqueous carboxyl group-containing polyurethane solution A added in Example 1, the aqueous carboxyl group-containing polyurethane solutions B to I obtained in Synthesis Examples 7 to 14 were used in the same amount.

Example 10

Adjustment of Aqueous Pigment Dispersing Element (B)

10 parts of a methyl ethyl ketone solution of benzyl methacrylate-methacrylic acid copolymer having a solid content of 50% (with an acid value of 100 and a weight average molecular weight of 20,000), 10.0 parts of a 5% potassium hydroxide aqueous solution, 10 parts of a quinacridone-based pigment "Fastogen (registered trademark) Super Magenta RG" (manufactured by DIC Corporation) and 20.0 parts of water were charged and mixed in a 250 mL plastic bottle. (Here, the quinacridone-based pigment was charged in 10 parts, the resin was charged in an amount so as to achieve a ratio of 50% by mass with respect to the pigment in terms of the non-volatile content, the 5% potassium hydroxide aqueous solution was charged in an amount so as to neutralize the acid value of the resin by 100% and the water was charged in an amount necessary for making the non-volatile content of the mixed liquid to become 30%, respectively.)

The mixed liquid was dispersed for 2 hours with a paint conditioner (using zirconia beads having a diameter of 0.5 mm). Following the dispersion, the liquid obtained by removing the zirconia beads therefrom was evaporated using an evaporator to distill off methyl ethyl ketone, and was then subjected to a centrifugal separation (8,200 G, 30 minutes) to remove coarse particles, followed by the addition of pure water to adjust the non-volatile content, thereby yielding an aqueous pigment dispersing element (b) with a non-volatile content of 20%. The particle size of the obtained pigment dispersing element was 120 nm.

The aqueous pigment dispersing element (b) and the aqueous solution of the carboxyl group-containing polyurethane A obtained in Synthesis Example 6 were used and adjusted in accordance with the following composition, followed by the filtration using a filter with a pore size of 6 μm, thereby preparing an aqueous ink for inkjet recording (b-A) of a thermal system with a pigment concentration of 6%.

| | |
|---|---|
| Aqueous pigment dispersing element (b) | 22.5 parts |
| Aqueous carboxyl group-containing polyurethane solution A | 3.8 parts |
| Triethylene glycol monobutyl ether | 4.0 parts |
| 2-pyrrolidinone | 4.0 parts |
| Glycerin | 1.5 parts |
| Surfynol 440 (manufactured by Air Products and Chemicals Inc.) | 0.3 parts |
| Water | 13.9 parts |

Examples 11 and 12

Aqueous inks for inkjet recording (b-B) and (b-C) were prepared by conducting the same operation as that described in Example 10 with the exception that, instead of the aqueous carboxyl group-containing polyurethane solution A added in Example 10, the aqueous carboxyl group-containing polyurethane solutions B and C obtained in Synthesis Examples 7 and 8 were used in the same amount.

Example 13

Adjustment of Aqueous Pigment Dispersing Element (C)

10 parts of an MEK solution of the carboxyl group-containing polyurethane A, 4.0 parts of a 5% potassium hydroxide aqueous solution, 10 parts of a phthalocyanine-based pigment "Fastogen (registered trademark) Blue TGR" (manufactured by DIC Corporation) and 26.8 parts of water were charged and mixed in a 250 mL plastic bottle. (Here, the copper phthalocyanine-based pigment was charged in 10 parts, the resin was charged in an amount so as to achieve a ratio of 50% by mass with respect to the pigment in terms of the non-volatile content, the 5% potassium hydroxide aqueous solution was charged in an amount so as to neutralize the acid value of the resin by 100% and the water was charged in an amount necessary for making the non-volatile content of the mixed liquid to become 30%, respectively.)

The mixed liquid was dispersed for 2 hours with a paint conditioner (using zirconia beads having a diameter of 0.5 mm). Following the dispersion, the liquid obtained by removing the zirconia beads therefrom was evaporated using an evaporator to distill off methyl ethyl ketone, and was then subjected to a centrifugal separation (8,200 G, 30 minutes) to remove coarse particles, followed by the addition of pure water to adjust the non-volatile content, thereby yielding an aqueous pigment dispersing element (c) with a non-volatile content of 20%. The particle size of the obtained pigment dispersing element was 110 nm.

The aqueous pigment dispersing element (c) was used and adjusted in accordance with the following composition, followed by the filtration using a filter with a pore size of 6 μm, thereby preparing an aqueous ink for inkjet recording (c) of a thermal system.

| | |
|---|---|
| Aqueous pigment dispersing element (c) | 13.0 parts |
| Triethylene glycol monobutyl ether | 4.0 parts |
| 2-pyrrolidinone | 4.0 parts |
| Glycerin | 1.5 parts |
| Surfynol 440 (manufactured by Air Products and Chemicals Inc.) | 0.3 parts |
| Water | 27.2 parts |

Example 14

An aqueous pigment dispersing element d was obtained by conducting the same operation as that described in Example 13 with the exception that, instead of the MEK solution of the carboxyl group-containing polyurethane A obtained in Synthesis Example 6, the MEK solution of the carboxyl group-containing polyurethane C obtained in Synthesis Example 8 was used in the same amount. The particle size of the obtained pigment dispersing element was 120 nm. An aqueous ink for inkjet recording (d) was prepared by using this aqueous pigment dispersing element d and conducting the same mixing operation as that described in Example 13.

Comparative Examples 1 to 5

Aqueous inks for inkjet recording (a-H-J) to (a-H-N) were prepared by conducting the same operation as that described in Example 1 with the exception that, instead of the aqueous carboxyl group-containing polyurethane solution A added in Example 1, the aqueous carboxyl group-containing polyurethane solutions H-J to H-N obtained in Comparative Synthesis Examples 3 to 7 were used in the same amount.

<Performance Test and Evaluation Criteria>

(Inkjet Recording Test (Print Density and Gloss Value))

Drawing was conducted on a recording medium with a sample ink using a thermal inkjet printer BJ F300 (manufactured by Canon Inc., hereafter referred to as an evaluation machine A) equipped with a bubble jet (registered trademark) recording head (BC-30E, manufactured by Canon Inc.) or a thermal inkjet printer DJ 970CXi (manufactured by Hewlett-Packard Development Company, L.P., hereafter referred to as an evaluation machine B), and the ejection stability test, the print density test, the gloss value test, and the scratch resistance test were conducted.

As a recording medium, "Canon PB paper" manufactured by Canon Inc. or "Xerox 4024" manufactured by Fuji Xerox Co., Ltd. was used as a plain paper, and "Premium Glossy Photo Paper" manufactured by Seiko Epson Corporation was used as an inkjet paper.

(Ejection Stability)

A solid image was continuously printed on the plain paper. The ejection stability was determined in a manner such that the more the number of pieces of paper printed by the continuous printing (i.e., the number of pieces of paper which can be printed with no defective image caused by the discharge failure or the like), the better, and was evaluated based on the following three stages of criteria.

A: 300 or more pieces of printed paper

B: 100 pieces or more and less than 300 pieces of printed paper

C: Less than 100 pieces of printed paper (Print Density)

A solid image was printed on the inkjet paper, and the color image density was measured at 5 points in each sample using a print density measuring device (GRETAG (registered trademark) D196 manufactured by GretagMacbeth Corporation), and the average of these measurements was calculated as the print density. The larger the average value, the better the print density, and the print density was evaluated based on the following three stages of criteria.

A: Print density of 2.5 or more

B: Print density of 2.0 or more and less than 2.5

C: Print density of less than 2.0

(Measurement of Image Gloss Value)

A solid image was printed on the inkjet paper, and the gloss of the color image was measured with a measuring angle of 20 degrees using the haze gloss meter (manufactured by BYK-Gardner) as a gloss value measuring device. The measurements were made at 3 points in each sample, and the average of these measurements was calculated as the gloss value. The larger the average value, the better the gloss, and the gloss value was evaluated based on the following four stages of criteria.

A: Gloss value of 40 or more

B: Gloss value of 30 or more

C: Gloss value of 20 or more and less than 30

D: Gloss value of less than 10

(Scratch Resistance)

A solid image was printed on the inkjet paper and was rubbed 5 times with a load of 200 g using a Gakushin-type rubbing tester while using the plain paper as a filler paper cord. The gloss values of the printed papers were measured before and after the test. The smaller the rate of change in the gloss value, the better the scratch resistance, and the scratch resistance was evaluated based on the following four stages of criteria.

A: Rate of gloss change of less than 5%

B: Rate of gloss change of 5% or more and less than 10%

C: Rate of gloss change of 10% or more and less than 15%

D: Rate of gloss change of 15% or more (Storage Stability of Ink for Inkjet Recording)

The viscosity of the ink for inkjet recording when stored at 70° C. for 7 days was measured, and those exhibited a rate of change with respect to the initial viscosity of less than 5% were evaluated as "A", those exhibited the rate of change of 5% or more and less than 10% were evaluated as "B", and those exhibited the rate of change of 10% or more were evaluated as "C". Note that the viscosity measurements were conducted using the RE-550 viscometer (manufactured by Told Sangyo Co., Ltd.).

The performance test results of the aqueous pigment dispersing element and the aqueous ink for inkjet recording of the present invention are summarized and shown in the table.

TABLE 2

| | Name of aqueous ink | Name of reaction product | Carboxyl group-containing polyurethane: Reaction index of reaction product | Property of aqueous solution | Acid value | Discharge properties: Evaluation machine A | Evaluation machine B | Scratch resistance | Density | Gloss | Storage stability |
|---|---|---|---|---|---|---|---|---|---|---|---|
| Ex. 1 | (a-A) | (1-1) | 0.998 | Transparent | 38 | A | A | B | A | A | A |
| Ex. 2 | (a-B) | (1-2) | 0.98 | Transparent | 33 | A | A | A | A | A | A |
| Ex. 3 | (a-C) | (1-3) | 0.977 | Transparent | 41 | A | A | A | A | A | A |
| Ex. 4 | (a-D) | (1-4) | 1.068 | Transparent | 41 | A | A | A | A | A | A |
| Ex. 5 | (a-E) | (1-2) | 0.98 | Transparent | 42 | B | B | A | A | B | A |
| Ex. 6 | (a-F) | (1-1) | 0.998 | Transparent | 36 | A | A | C | A | B | B |
| Ex. 7 | (a-G) | (1-1) | 0.998 | Transparent | 17 | B | B | B | B | B | B |

TABLE 2-continued

| | Name of aqueous ink | Name of reaction product | Reaction index of reaction product | Property of aqueous solution | Acid value | Evaluation machine A | Evaluation machine B | Scratch resistance | Density | Gloss | Storage stability |
|---|---|---|---|---|---|---|---|---|---|---|---|
| | | Carboxyl group-containing polyurethane | | | | Discharge properties | | | | | |
| Ex. 8 | (a-H) | (1-3) | 0.977 | Transparent | 75 | A | A | C | A | B | A |
| Ex. 9 | (a-I) | (1-5) | 0.99 | Transparent | 28 | A | A | A | A | A | A |
| Ex. 10 | (b-A) | (1-1) | 0.998 | Transparent | 38 | A | A | B | A | A | A |
| Ex. 11 | (b-B) | (1-2) | 0.98 | Transparent | 33 | A | A | A | A | A | A |
| Ex. 12 | (b-C) | (1-3) | 0.977 | Transparent | 41 | A | A | A | A | A | A |
| Ex. 13 | (c) | (1-1) | 0.998 | Transparent | 38 | A | A | B | A | A | A |
| Ex. 14 | (d) | (1-3) | 0.977 | Transparent | 41 | A | A | A | A | A | A |
| Comp. Ex. 1 | (a-H-J) | | | Milky white color | 45 | C | C | C | B | C | B |
| Comp. Ex. 2 | (a-H-K) | | | Milky white color | 45 | B | B | D | B | D | B |
| Comp. Ex. 3 | (a-H-L) | | | Milky white color | 45 | C | C | B | A | C | C |
| Comp. Ex. 4 | (a-H-M) | | 0.76 | Milky white color | 45 | C | C | C | A | C | C |
| Comp. Ex. 5 | (a-H-N) | | 1.14 | Milky white color | 41 | C | C | C | B | C | C |

From the results shown in Table 2, it is apparent that the aqueous ink for inkjet recording of the present invention that uses a carboxyl group-containing polyurethane exhibits excellent storage stability and ejection stability, and the materials obtained by inkjet printing are superior in terms of gloss and exhibit high levels of color image density and scratch resistance. Especially in Examples 1 to 4 and 9 to 12 where the molecular weight of the carboxyl group-containing polyurethane was within the range from 10,000 to 50,000 and also the acid value was within the range from 20 to 70, the ejection stability and the gloss value were remarkably superior, which resulted in the printing of 300 or more pieces of paper and the gloss value or 40 or more.

In Example 5, although the scratch resistance was excellent due to the high molecular weight of 60,000, the discharge properties were somewhat deteriorated. Further, in Example 6, although the discharge properties were favorable due to the low molecular weight of 8,000, the scratch resistance was somewhat poor. In Example 7, the particle size was 80 nm and somewhat large due to the low acid value, thereby slightly impairing the discharge properties. Further, in Example 8, the scratch resistance was somewhat poor because of the high acid value.

On the other hand, in Comparative Examples 1, 2 and 3 which contained no carboxyl group-containing polyurethane as the reaction product (1), the ejection stability and the scratch resistance were both poor. Comparative Example 4 was an example where the reaction index was low, whereas Comparative Example 5 was an example where the reaction index was high, although the ejection stability was remarkably poor in this case.

The invention claimed is:

1. A method for producing an aqueous polymer to be used in a pigment dispersion that essentially contains water, the aqueous polymer and a pigment, the method comprising:

reacting a diol compound (A) having one or two carboxyl groups within each molecule with a diisocyanate compound (B), thereby producing a reaction product which has a reaction index as calculated by Formula 1 and Formula 2 within a range from 0.95 to 1.10, and comprises a compound represented by [chemical formula (1)]; followed by reacting the reaction product and a diol compound (C), or the reaction product, the diol compound (C) and a diisocyanate group (D);

wherein [Chemical Formula 1] is:

[Chemical Formula 1]

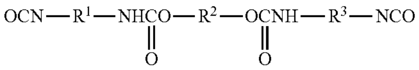

(1)

wherein $R^1$ and $R^3$ represent structures of the diisocyanate compound (B) from which the isocyanate group has been excluded, and $R^1$ and $R^3$ may be the same or may be different; and $R^2$ represents a structure of the diol compound (A) having one or two carboxyl groups within each molecule and from which the hydroxyl group has been excluded;

wherein Formula 1 is: Reaction index=(reaction rate of isocyanate group)×[(number of moles of diisocyanate compound (B))/(number of moles of diol compound (A))]; and wherein Formula 2 is: (the reaction rate of the isocyanate group)=1−(quantitative value of the isocyanate group in the reaction product)/(quantitative value of the isocyanate group prior to the reaction), and wherein the quantitative value of the isocyanate group is determined by the method described in ISO014896.

2. The method for producing an aqueous polymer according to claim 1, wherein an acid value of the aqueous polymer is from 20 to 70 mgKOH/g.

3. A method for producing an aqueous polymer to be used in a pigment dispersion for an aqueous ink for inkjet recording that essentially contains water, the aqueous polymer and a pigment, the method comprising:

reacting a diol compound (A) having one or two carboxyl groups within each molecule with a diisocyanate compound (B), thereby producing a reaction product which has a reaction index as calculated by Formula 1 and Formula 2 within a range from 0.95 to 1.10, and comprises a compound represented by [chemical formula (I)]; followed by reacting the reaction product and a diol compound (C), or the reaction product, the diol compound (C) and a diisocyanate group (D);

wherein [Chemical Formula 1] is:

[Chemical Formula 1]

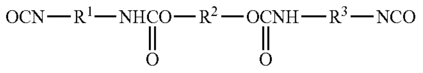

(1)

wherein $R^1$ and $R^3$ represent structures of the diisocyanate compound (B) from which the isocyanate group has been excluded, and $R^1$ and $R^3$ may be the same or may be different; and $R^2$ represents a structure of the diol compound (A) having one or two carboxyl groups within each molecule and from which the hydroxyl group has been excluded;

wherein Formula 1 is: Reaction index=(reaction rate of isocyanate group)×[(number of moles of diisocyanate compound (B))/(number of moles of diol compound (A))]; and wherein Formula 2 is: (the reaction rate of the isocyanate group)=1−(quantitative value of the isocyanate group in the reaction product)/(quantitative value of the isocyanate group prior to the reaction), and wherein the quantitative value of the isocyanate group is determined by the method described in ISO14896.

4. The method for producing an aqueous polymer according to claim 3, wherein an acid value of the aqueous polymer is from 20 to 70 mgKOH/g.

* * * * *